(12) United States Patent
Janowiak et al.

(10) Patent No.: US 10,300,769 B2
(45) Date of Patent: May 28, 2019

(54) VISOR WITH A LIGHT-BASE

(71) Applicant: Irvin Automotive Products, Inc., Pontiac, MI (US)

(72) Inventors: Anthony R. Janowiak, Rochester Hills, MI (US); Leslie Hinds, Oxford, MI (US); Martin Rathsburg, Jr., Clarkston, MI (US); Robert J. Mayne, Jr., Lake Orion, MI (US)

(73) Assignee: Irvin Automotive Products, LLC, Pontiac, MI (US)

( * ) Notice: Subject to any disclaimer, the term of this patent is extended or adjusted under 35 U.S.C. 154(b) by 428 days.

(21) Appl. No.: 14/571,980

(22) Filed: Dec. 16, 2014

(65) Prior Publication Data
US 2016/0167573 A1 Jun. 16, 2016

(51) Int. Cl.
| | | |
|---|---|---|
| B60J 3/02 | (2006.01) | |
| B60Q 3/252 | (2017.01) | |
| F21S 2/00 | (2016.01) | |
| B60Q 3/64 | (2017.01) | |
| B60Q 3/80 | (2017.01) | |

(52) U.S. Cl.
CPC ............ *B60J 3/0282* (2013.01); *B60Q 3/252* (2017.02); *B60Q 3/64* (2017.02); *B60Q 3/80* (2017.02)

(58) Field of Classification Search
CPC .... B60Q 3/004; B60Q 3/0226; B60Q 3/0293; B60Q 3/252; B60Q 3/64; B60Q 3/80; B60J 3/0282
USPC ....... 362/511, 494, 135, 140, 492, 136, 142, 362/540, 488
See application file for complete search history.

(56) References Cited

U.S. PATENT DOCUMENTS

| | | | |
|---|---|---|---|
| 4,479,172 A * | 10/1984 | Connor | B60J 3/0282 362/135 |
| 5,267,090 A * | 11/1993 | Dowd | B60J 3/0282 296/97.5 |
| 6,464,381 B2 | 10/2002 | Anderson, Jr. et al. | |
| 6,499,868 B1 | 12/2002 | Kerul, Jr. | |
| 6,550,949 B1 * | 4/2003 | Bauer | B60Q 1/0023 257/118 |
| 6,871,990 B2 | 3/2005 | Imazeki et al. | |
| 7,032,949 B1 | 4/2006 | Wang et al. | |
| 7,036,965 B2 | 5/2006 | Dalton, Jr. et al. | |
| 7,201,427 B2 | 4/2007 | Wang et al. | |
| 7,510,311 B2 * | 3/2009 | Romas | B60Q 1/2665 362/494 |
| 7,534,018 B2 | 5/2009 | Nicola et al. | |
| 7,559,667 B2 | 7/2009 | Holderman | |
| 7,780,322 B2 | 8/2010 | Muller et al. | |
| 7,862,220 B2 | 1/2011 | Cannon et al. | |
| 7,909,383 B2 * | 3/2011 | Dolisy | B60J 3/0282 296/97.1 |
| D643,951 S | 8/2011 | Cai | |
| 8,096,688 B2 | 1/2012 | Kino et al. | |

(Continued)

*Primary Examiner* — Anh T Mai
*Assistant Examiner* — Arman B Fallahkhair
(74) *Attorney, Agent, or Firm* — Raggio & Dinnin, P.C.

(57) ABSTRACT

A visor for use in a vehicle is disclosed. The visor comprises a pivot rod and a carrier arranged over the pivot rod. The visor also comprises a first and second shell being engagable to form a visor body and a vanity arranged therein. The visor also comprises a light base secured to the second shell and a circuit board engaging the light base. The visor also comprises a light emitting diode secured to a surface of the circuit board.

17 Claims, 20 Drawing Sheets

(56) References Cited

U.S. PATENT DOCUMENTS

| | | | |
|---|---|---|---|
| 8,102,279 B2* | 1/2012 | Foote | B60Q 1/2665 |
| | | | 340/433 |
| 8,215,810 B2 | 7/2012 | Welch, Sr. et al. | |
| 8,382,189 B2* | 2/2013 | Li | B29C 45/1418 |
| | | | 296/97.5 |
| 8,408,773 B2* | 4/2013 | Judge | B60Q 1/2696 |
| | | | 362/605 |
| 8,425,094 B2 | 4/2013 | Stakoe et al. | |
| 8,596,803 B2 | 12/2013 | Schultz et al. | |
| 8,608,355 B2 | 12/2013 | Bruhnke et al. | |
| 2006/0181893 A1* | 8/2006 | Fernandez | B60J 3/0282 |
| | | | 362/494 |
| 2008/0130305 A1* | 6/2008 | Wang | B60Q 3/0226 |
| | | | 362/492 |

* cited by examiner

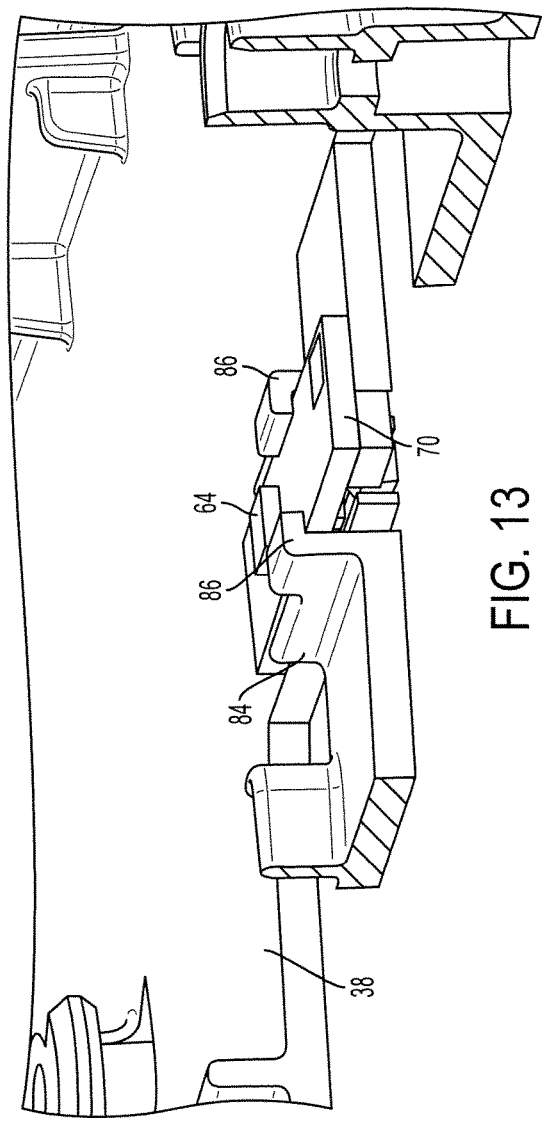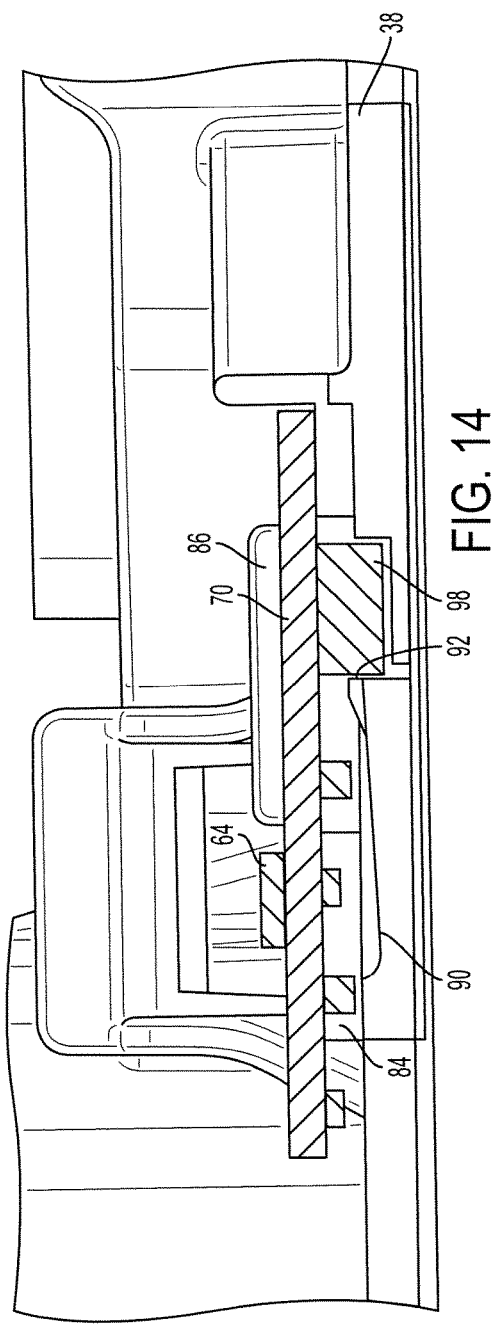

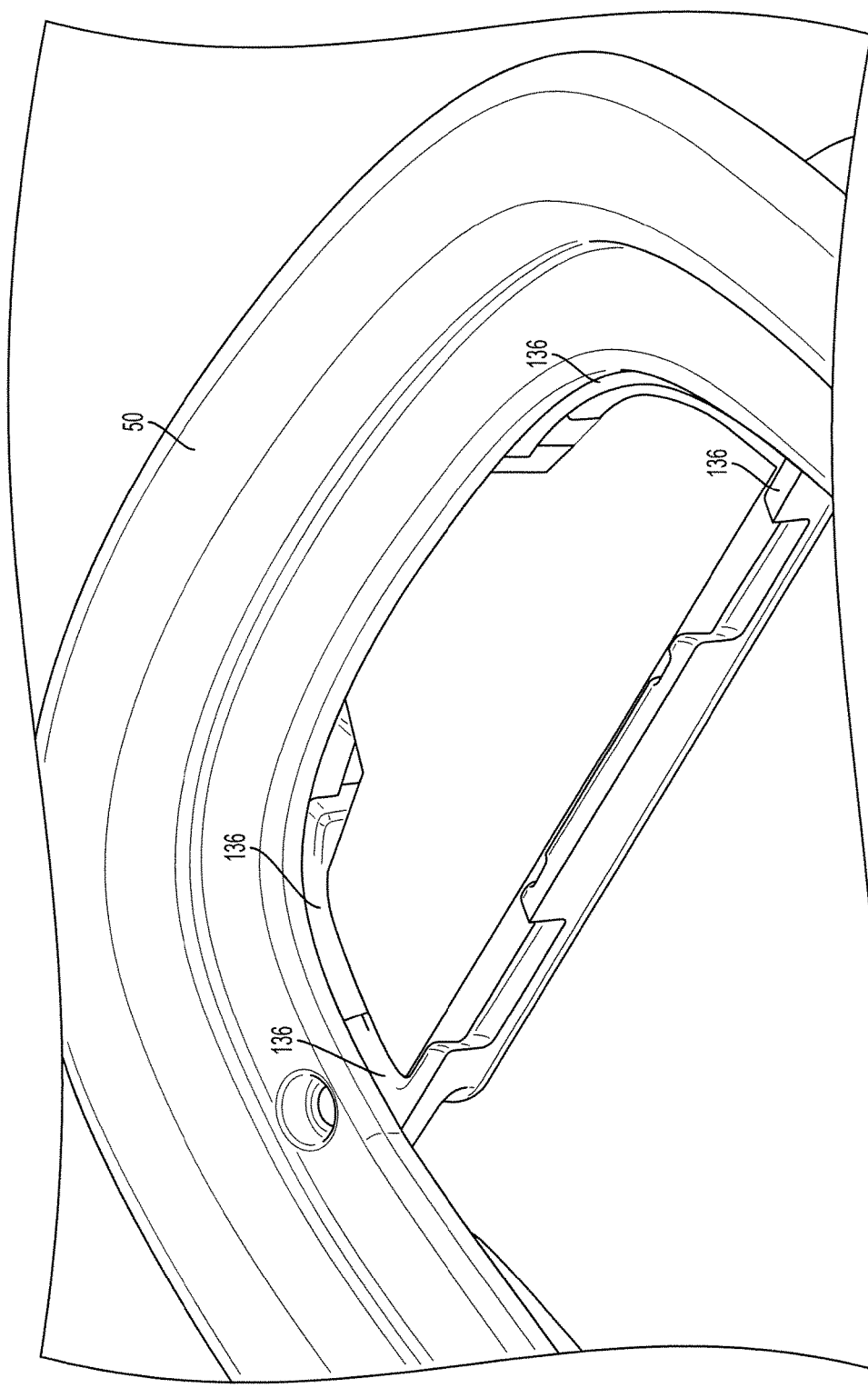

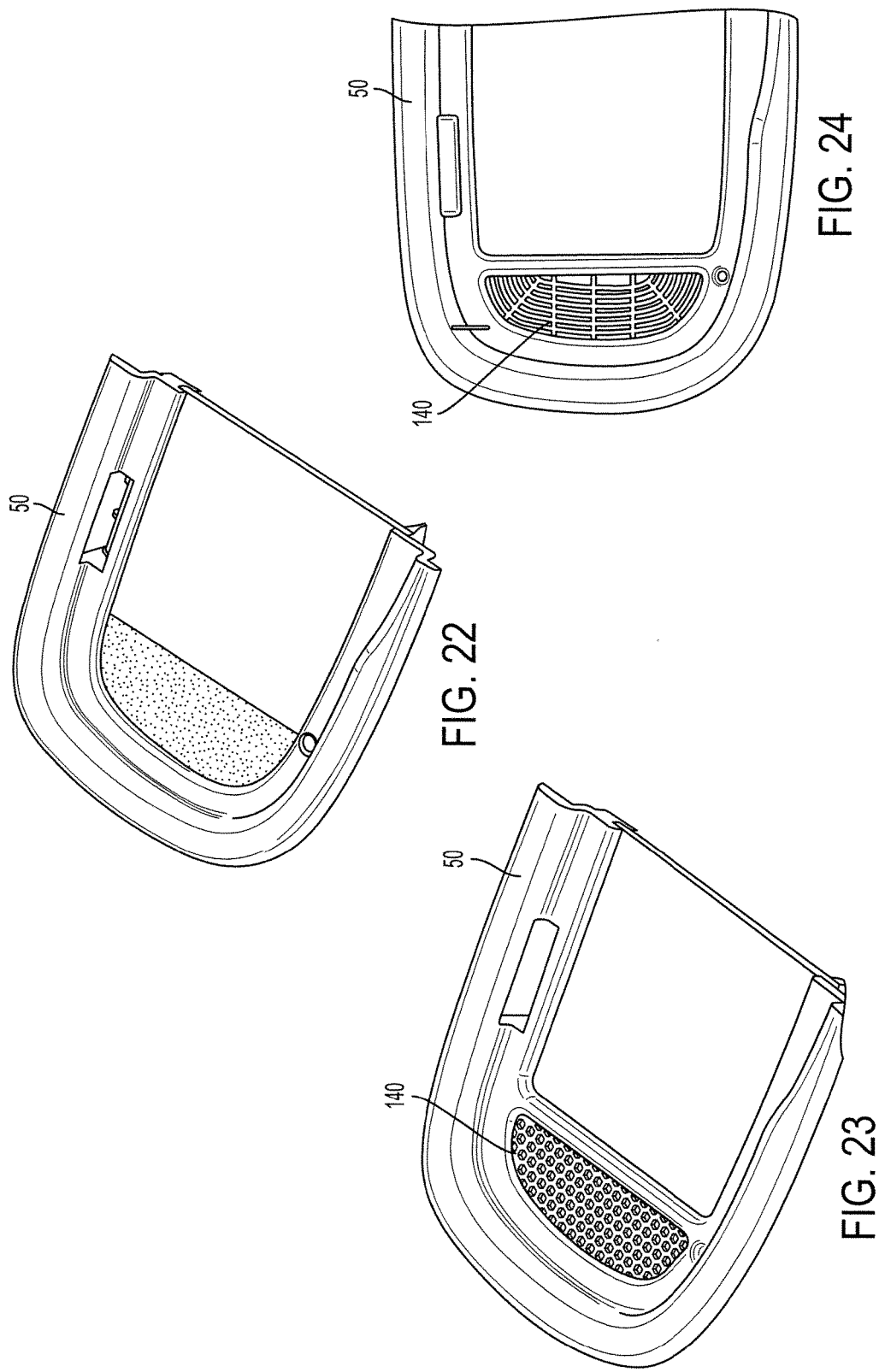

VISOR WITH A LIGHT-BASE

BACKGROUND OF THE INVENTION

1. Field of the Invention

The present invention generally relates to a sun visor for interior use in a vehicle, and more particularly relates to a sun visor, having a visor body that includes a vanity having a light emitting diode (LED) to provide light therefore.

2. Description of Related Art

Sun visors are well known and widely used in the prior art. Many different types and designs have been successfully employed in vehicles over the years. Many of these prior art visors have been developed in a variety of ways through which visor bodies and other interior components may be constructed and mounted within a vehicle. Advances in design may often add complexities to the manufacturing processes for interior components. There has been and continues to be a premium in the automotive industry on cost savings, weight reduction, and improvements in the efficiency and speed in the manufacturing processes for such components therein. One area of particular focus in the automobile technology field has been reducing the number and the complexity of steps required to assemble interior components such as sun visors or visors for use in a vehicle.

Generally, in the prior art, manufacturing simplicity continues to drive innovations in the automotive industry, loss of quality and performance in manufactured interior components for the sake of facilitating production is seldom, if ever acceptable. There is a substantial body of prior art relating to the specific structure of the visor to provide a strong, lightweight construction that matches or compliments the vehicle interior trim in a cost effective manner. Of particular interest has been the "clamshell" type construction, which involves the molding of two shell pieces or clamshell halves, which are joined to form the visor. In one typical clamshell design, the visor halves are formed as a single piece attached along a longitudinal edge, and then folded to form the visor body. The exterior surface can be molded to provide a suitable visor surface, or a desired outer covering may be added in a variety of ways known in the prior art.

The clamshell design allows the visor body to be constructed relatively quickly and easily, however, the various components that are attached to the visor clamshell halves must in some cases be incorporated with several assembly steps prior to securing the clamshell halves together. For example, several known designs require insertion of additional mounting or journaling pieces for retention of the visor pivot rod within the visor body. The construction of visors having such a design is relatively time-intensive. Moreover, the various slides, journals, retainers, etc., utilized in the construction may add significant expense and weight to the overall visor, along with unwanted noise, and increase the number of components necessary to build one therein. Many of these prior art visors use standard light bulbs, such as incandescent bulbs to provide light for either a vanity which includes a mirror arranged within the visor, or for a map light that is sometimes arranged within the visor. The use of the incandescent bulb draws more current and power than that of newer technologies, such as a LED bulb.

In come cases, eliminating parts may reduce the expense of manufacturing and constructing the visor. Decreasing size and weight, however, can be accompanied by decreases in strength. Furthermore, the visors that attempt to change well accepted technology, like incandescent light bulbs with new technology, such as a LED, may run into problems with consumers and users of the vehicle not accepting the look and feel of the light emitted by an LED versus that of a light emitted by an incandescent prior art light bulb. The use of new technology, such as a LED over a prior art light bulb, may increase the efficiency and reduce manufacturing assembly times for visors in the automotive and other vehicular art. Hence, it is desirable in the art to provide a visor that is light weight, easy to manufacture and uses relatively few components, yet utilizes a design imparting significant durability to withstand heavy and repeated use and to provide a solid construction with tight tolerances throughout the entire system. Furthermore, there is a need in the art for an improved visor that has a LED lighted vanity and/or map light arranged therein. There also is a need in the art for a sun visor that uses a variety of methods of aligning a LED with a lens for use in the vanity or a LED used in conjunction with a light guide in a vanity to provide a more even appearance and distribute the light in a more aesthetic pleasing fashion than prior art light bulbs. There also is a need in the art for a vanity that may use one light to light both sides of a vanity mirror through the use of a light guide system arranged therein.

SUMMARY OF THE INVENTION

One object of the present invention may be that it provides an improved visor.

Another object of the present invention may be that it provides a visor that has a light emitting diode (LED) for use in illuminating a mirror of a vanity.

Yet a further object of the present invention may be that it provides a visor that uses a LED as a direct replacement for a prior art light bulb.

Still another object of the present invention may be that it provides a visor that uses a LED as the light source along with a light guide to illuminate a vanity mirror in a visor.

Still another object of the present invention may be that it provides a visor that includes a light base that is capable of holding a circuit board having a LED thereon in either a horizontal or vertical position.

Yet another object of the present invention may be that it provides a visor that has a map light that is illuminated with a LED.

Still another object of the present invention may be that it provides a visor that includes a wire arranged between a circuit board and the electrical system of the vehicle to provide LED lighting in a visor vanity.

Still another object of the present invention may be to provide a visor that is easier to manufacture and more efficient through the use of a LED lighted vanity.

Still another object of the present invention may be that it provides a visor that is more robust and includes a lighting system that is more reliable and longer lasting than prior art lighting systems.

According to the present invention, the foregoing and other objects and advantages are obtained by a novel design for a visor for use in a vehicle. The visor generally comprises a pivot rod and a carrier arranged over the pivot rod. The visor further comprises a first and second shell engagable to form a visor a body. The visor also comprises a vanity arranged within the visor body. The visor further comprises a light base secured to the second shell of the visor body and a circuit board engaging the light base. The visor also comprises a light emitting diode secured to a surface of the circuit board.

One advantage of the present invention may be that it provides for an improved visor.

A further advantage of the present invention may be that it provides for a visor that uses a LED as the light source for a vanity.

Yet another advantage of the present invention may be that it provides for a direct replacement of a prior art light bulb with a LED arranged on a circuit board for a vanity in a visor.

Yet another advantage of the present invention may be that it provides for a light base for use in a visor that is capable of holding a LED arranged on a circuit board in either a vertical or horizontal position relative to the visor body.

Still another advantage of the present invention may be that it provides a visor that uses a LED in conjunction with a light guide to provide illumination for a vanity.

Still another advantage of the present invention may be that it provides a visor that uses a light base to align a LED in proper position with respect to a vanity therein.

Still another advantage of the present invention may be that it provides a visor that replaces prior art light bulbs with more energy efficient, reliable and longer lasting LED light sources.

Still another advantage of the present invention may be that it provides for a visor that is easier to manufacture and more robust than prior art visors.

Other objects, features and advantages of the present invention will become apparent from the subsequent description and appended claims, taken in conjunction with the accompanying drawings.

BRIEF DESCRIPTION OF THE DRAWINGS

FIG. 13 shows a plan view of a light base according to an alternate embodiment of the present invention.

FIG. 14 shows a section view of a light base according to an alternate embodiment of the present invention.

FIG. 21 shows a top view of a frame of a vanity for use in a visor according to the present invention.

FIG. 22 shows a vanity lens for use according to the present invention.

FIG. 23 shows a vanity for use according to an alternate embodiment of the present invention.

FIG. 24 shows a vanity for use in an alternate embodiment according to the present invention.

BRIEF DESCRIPTION OF THE EMBODIMENT(S)

Figure 1:
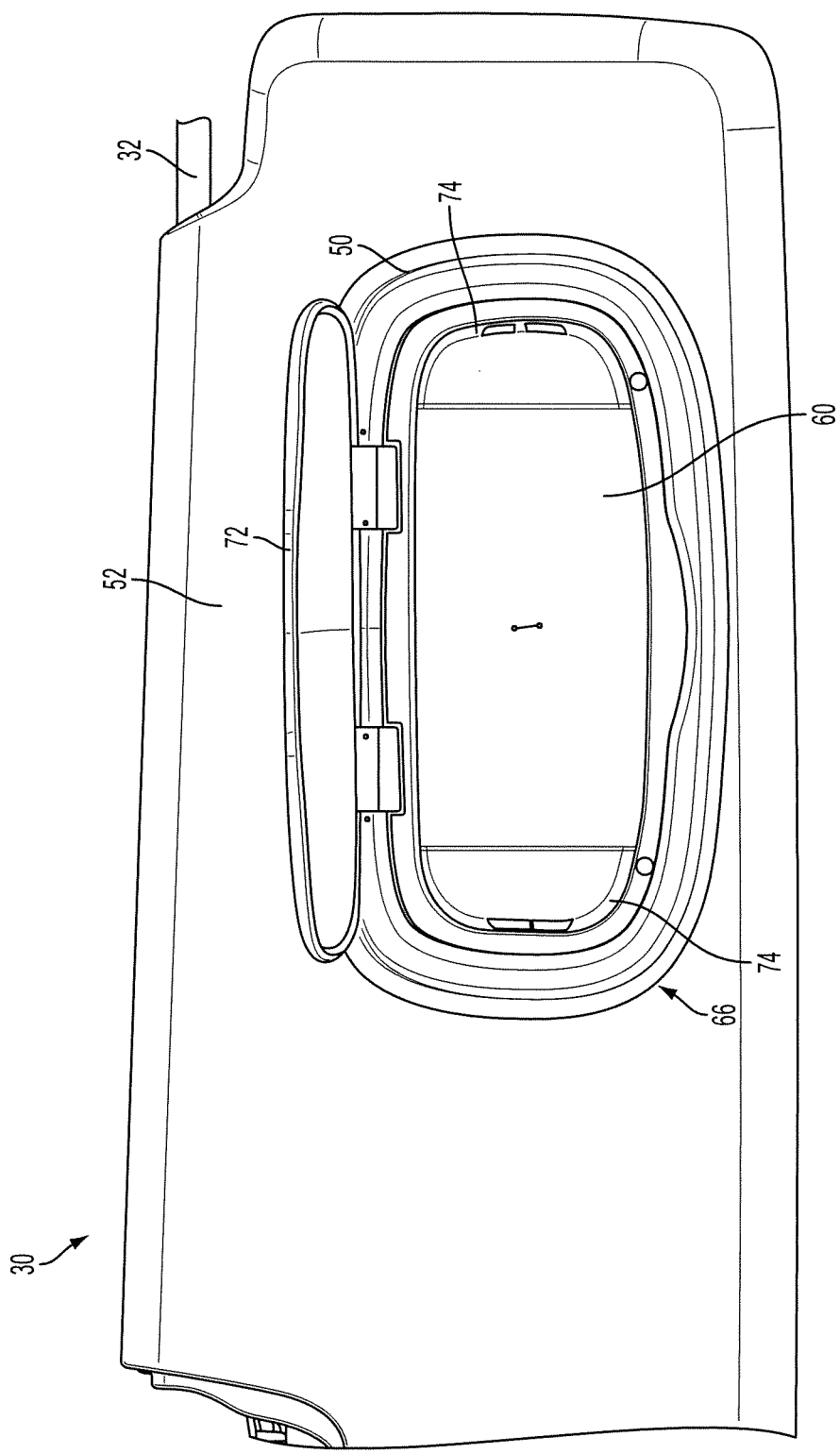
FIG. 1 shows a plan view of a visor according to the present invention.
Figure 2:
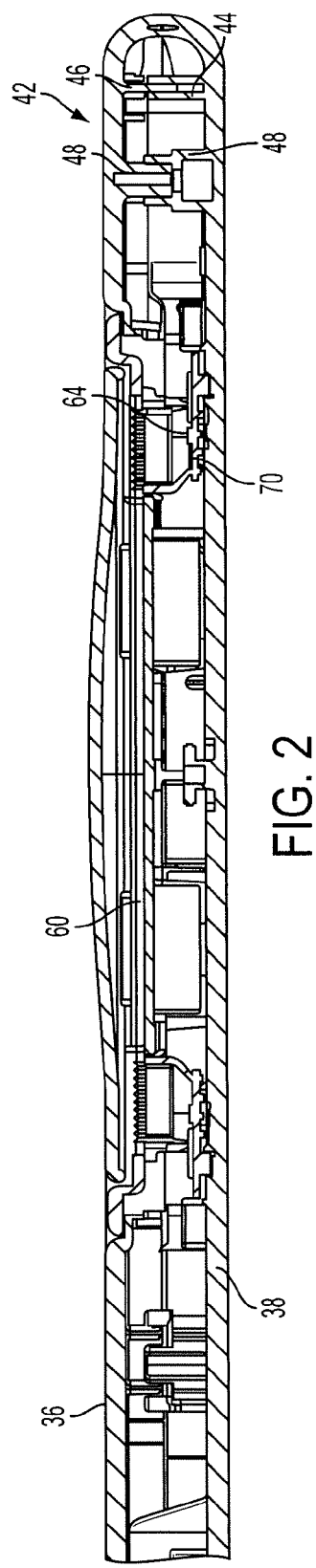
FIG. 2 shows a cross section of a visor according to the present invention.
Figure 3:
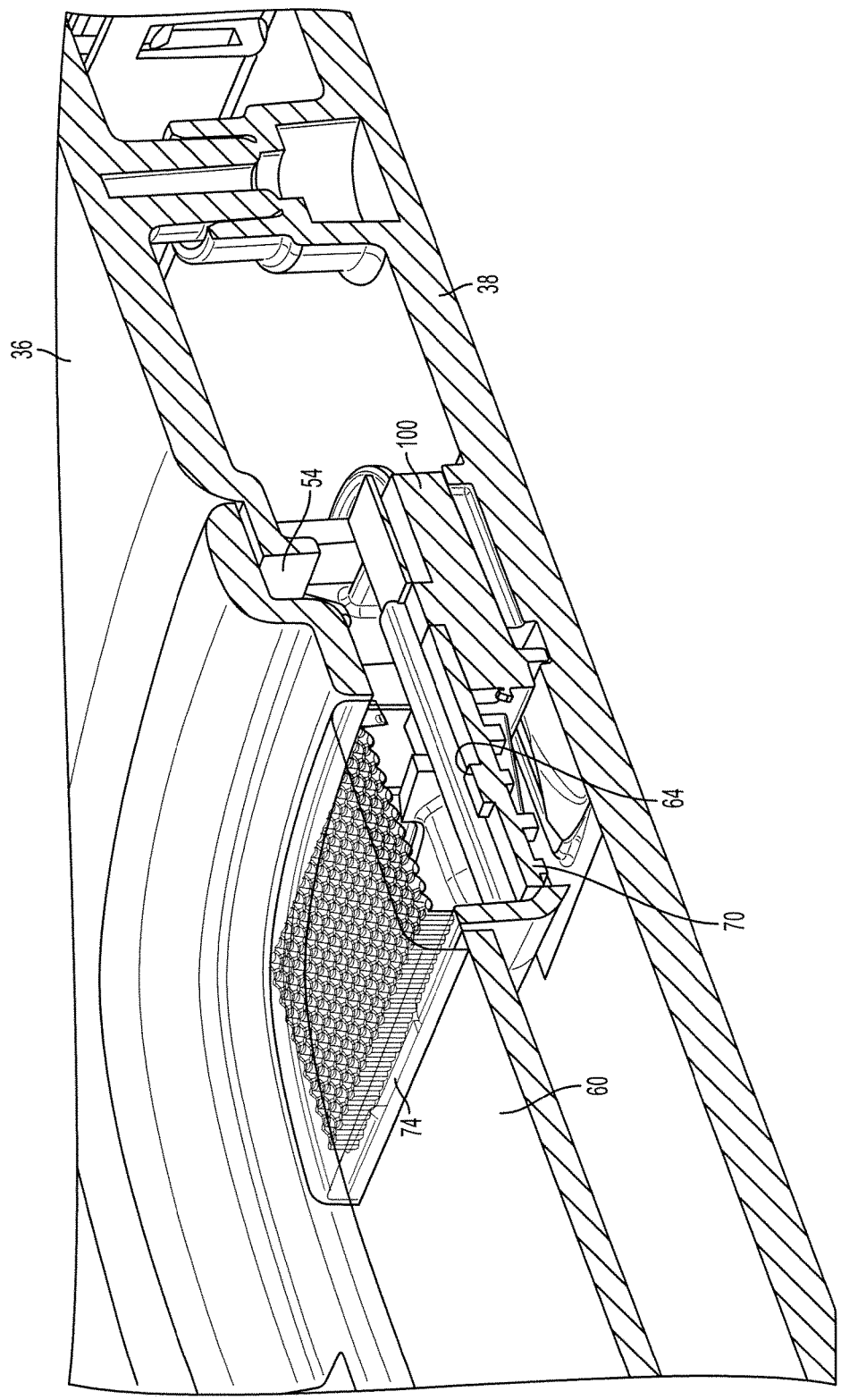
FIG. 3 shows a cross section of a visor according to the present invention.
Figure 4:
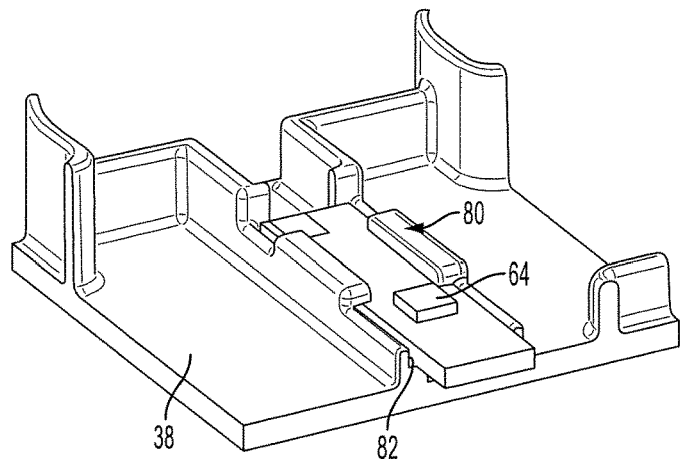
FIG. 4 shows a plan view of a circuit board and LED for use in a visor.
Figure 5:
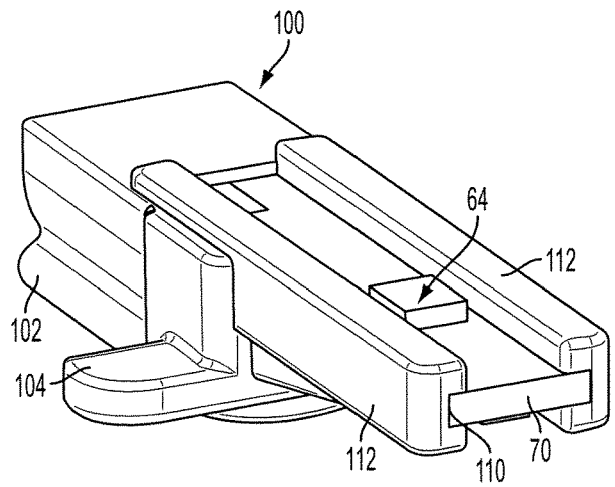
FIG. 5 shows a top view of a light base for use in a visor according to the present invention.
Figure 6:
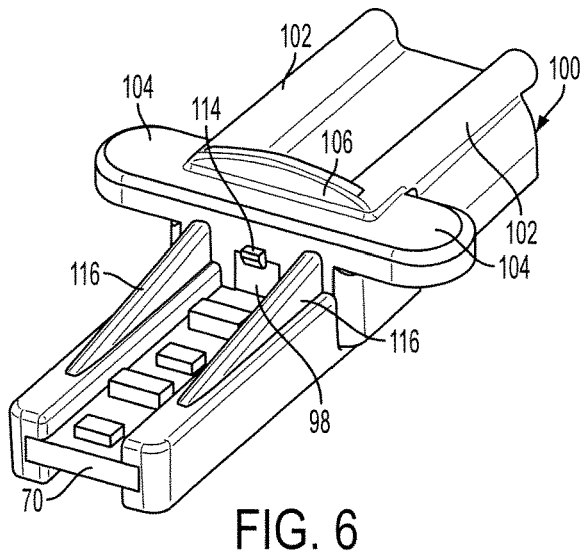
FIG. 6 shows a bottom view of a light base for a visor according to the present invention.
Figure 7:
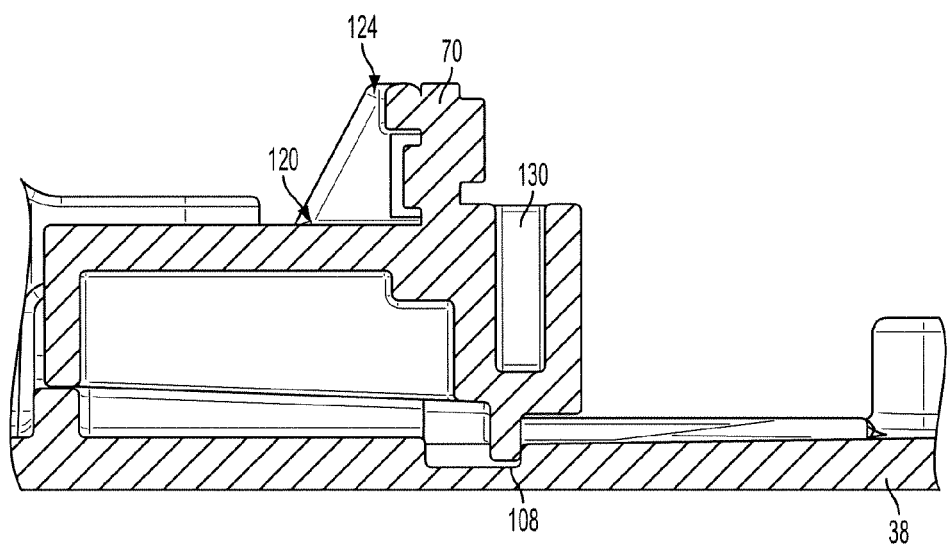
FIG. 7 shows a section view of a visor according to an alternate embodiment of the present invention.
Figure 8:
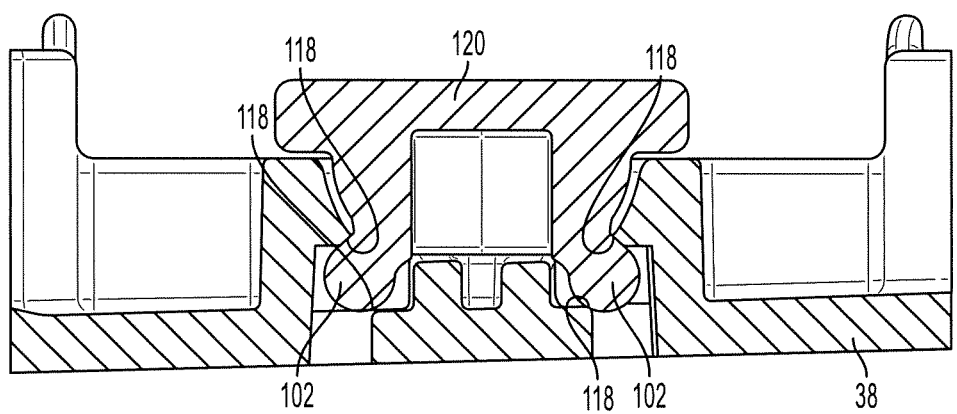
FIG. 8 shows a section view of a visor according to an alternate embodiment of the present invention.
Figure 9:
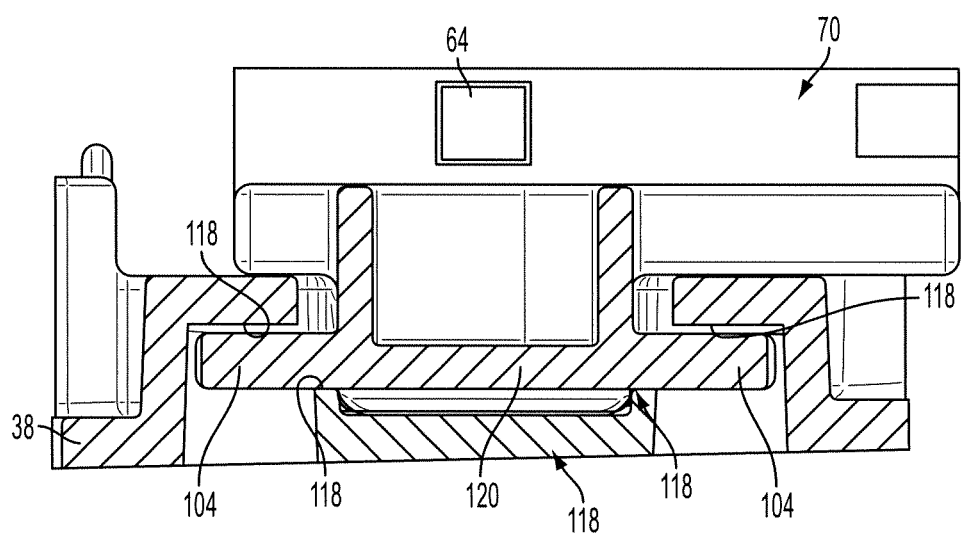
FIG. 9 shows a section of a visor according to an alternate embodiment of the present invention.
Figure 10:
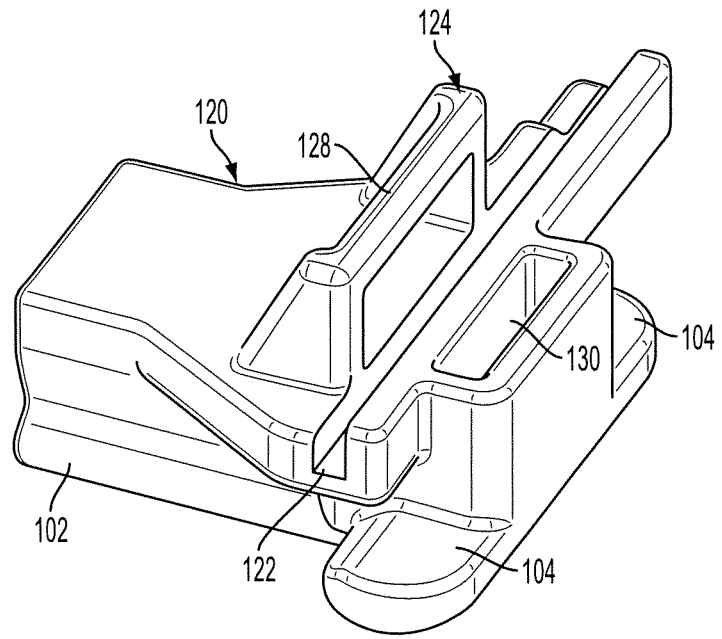
FIG. 10 shows a top view of a light base according to an alternate embodiment of the present invention.
Figure 11:
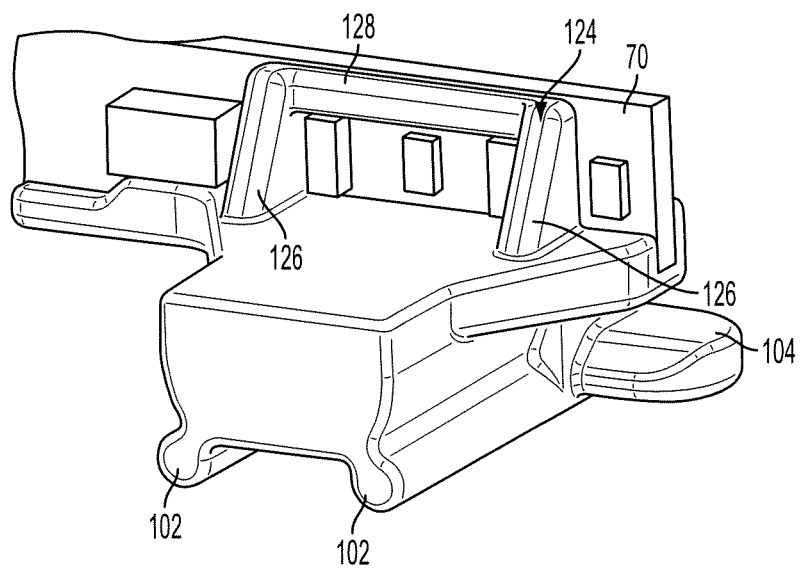
FIG. 11 shows a light base with a circuit board arranged therein according to an alternate embodiment of the present invention.
Figure 12:
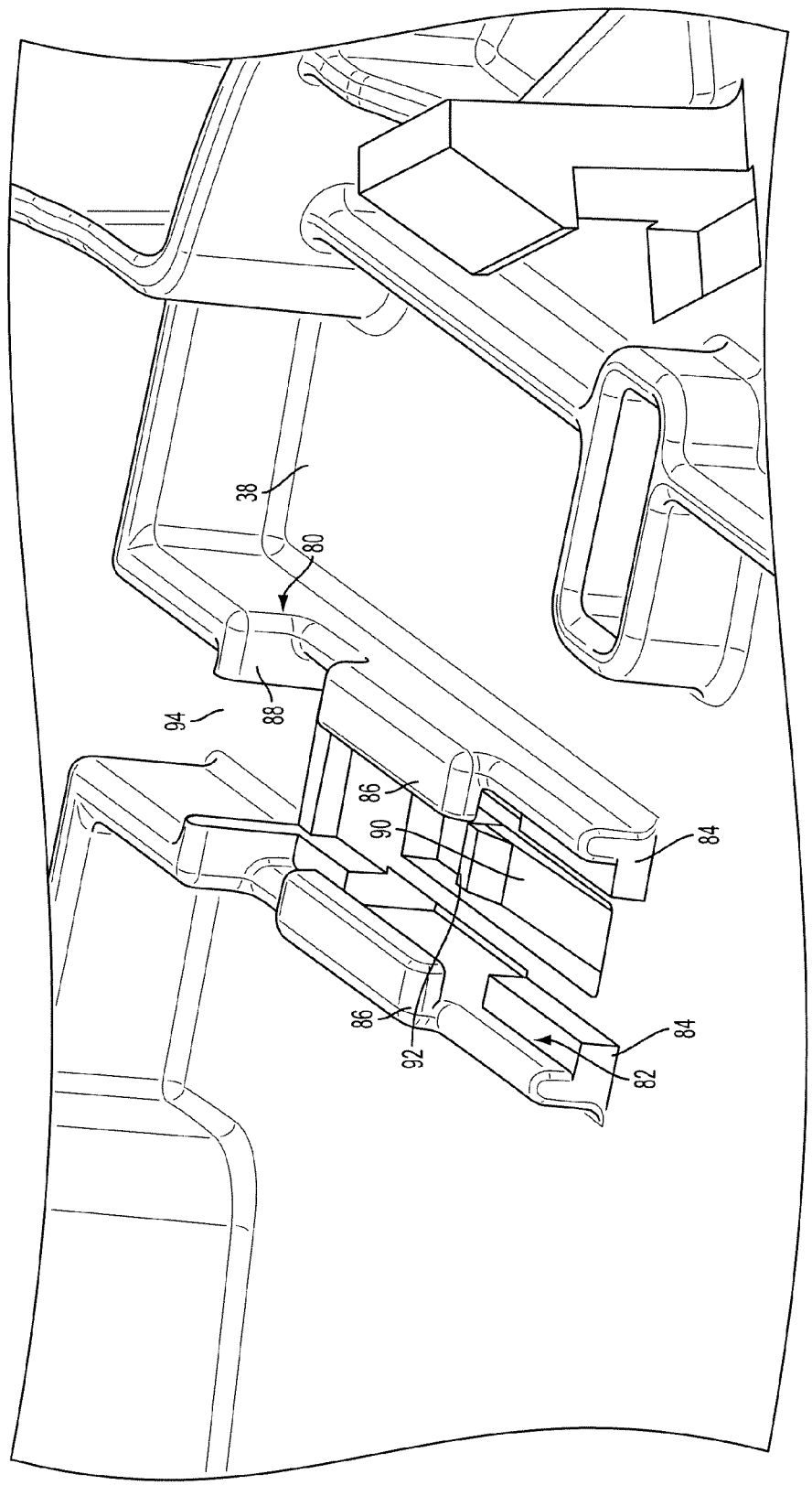
FIG. 12 shows a light base according to an alternate embodiment of the present invention.
Figure 15:
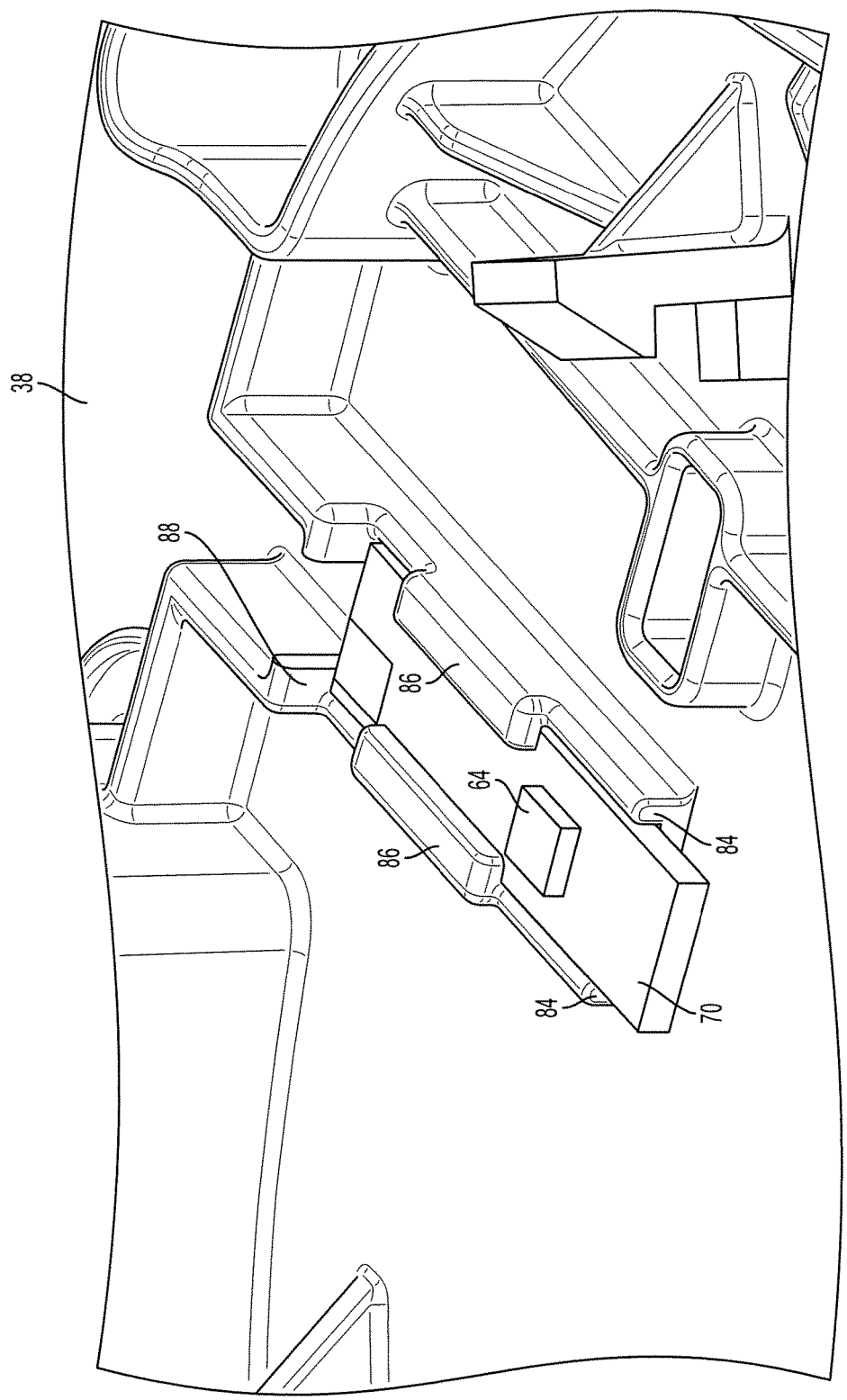
FIG. 15 shows a top view of a light base according to an alternate embodiment of the present invention.
Figure 16:
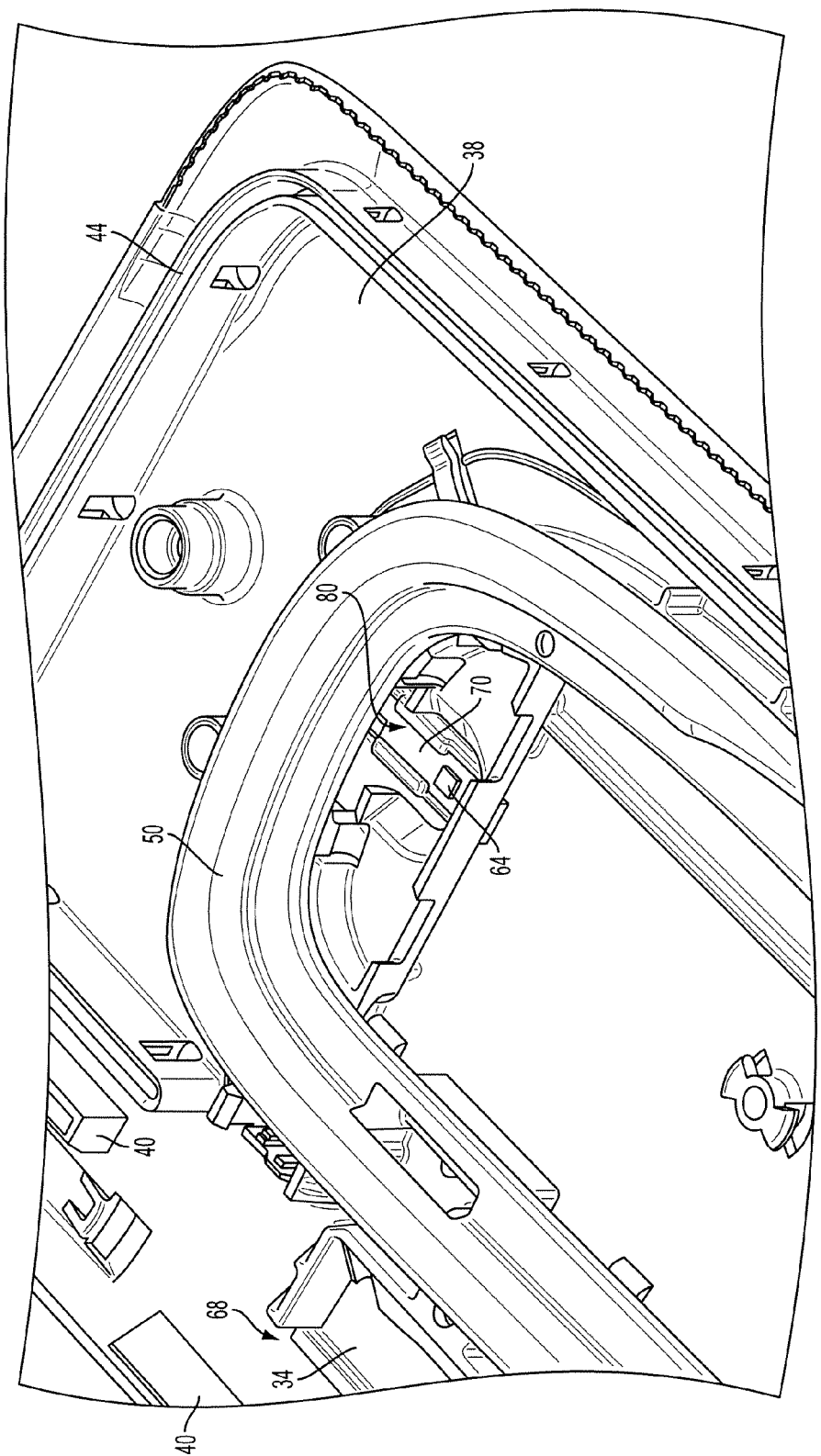
FIG. 16 shows a top view of a visor shell according to the present invention.
Figure 17:
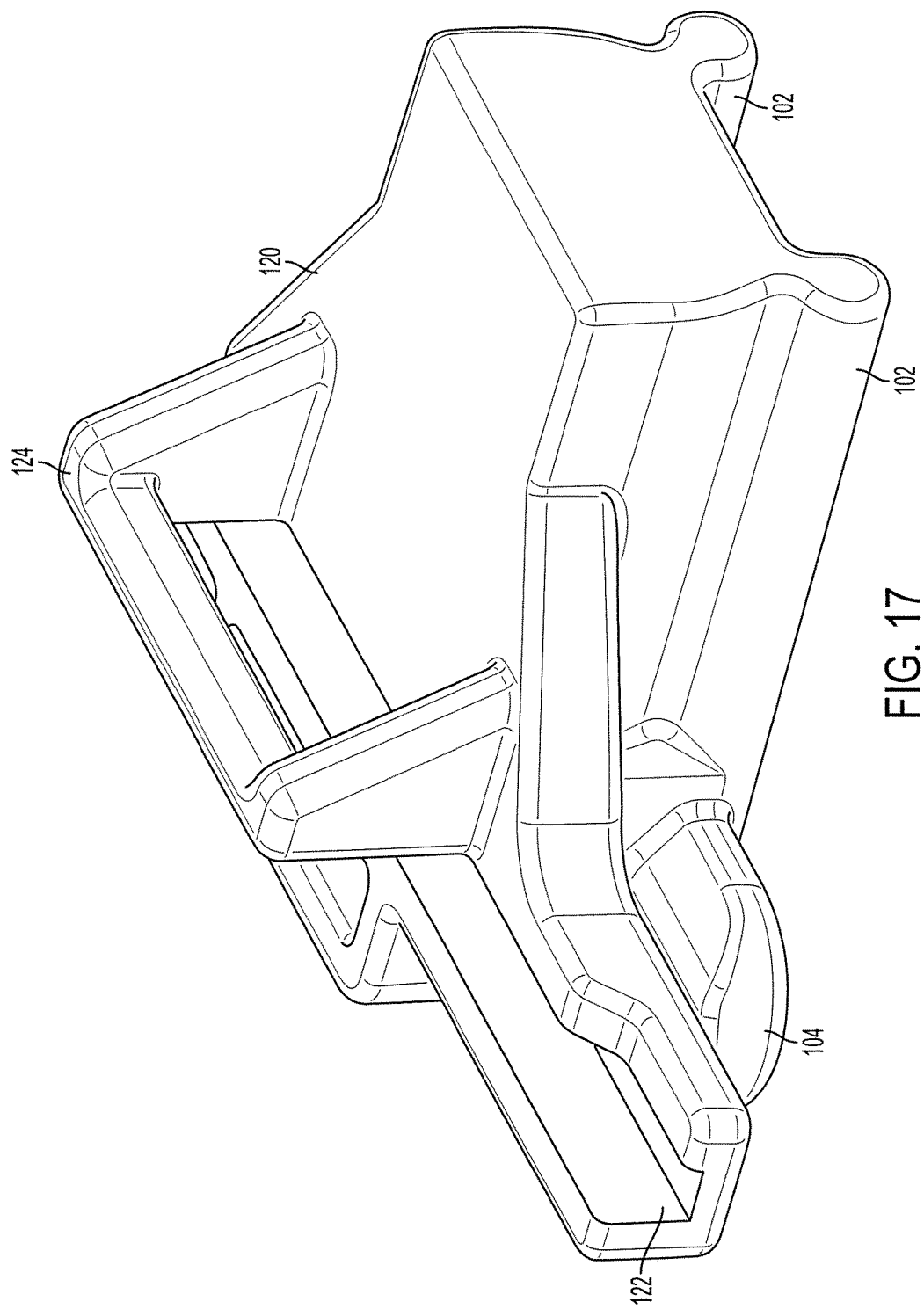
FIG. 17 shows a plan view of an alternate embodiment of a light base according to the present invention.
Figure 18:
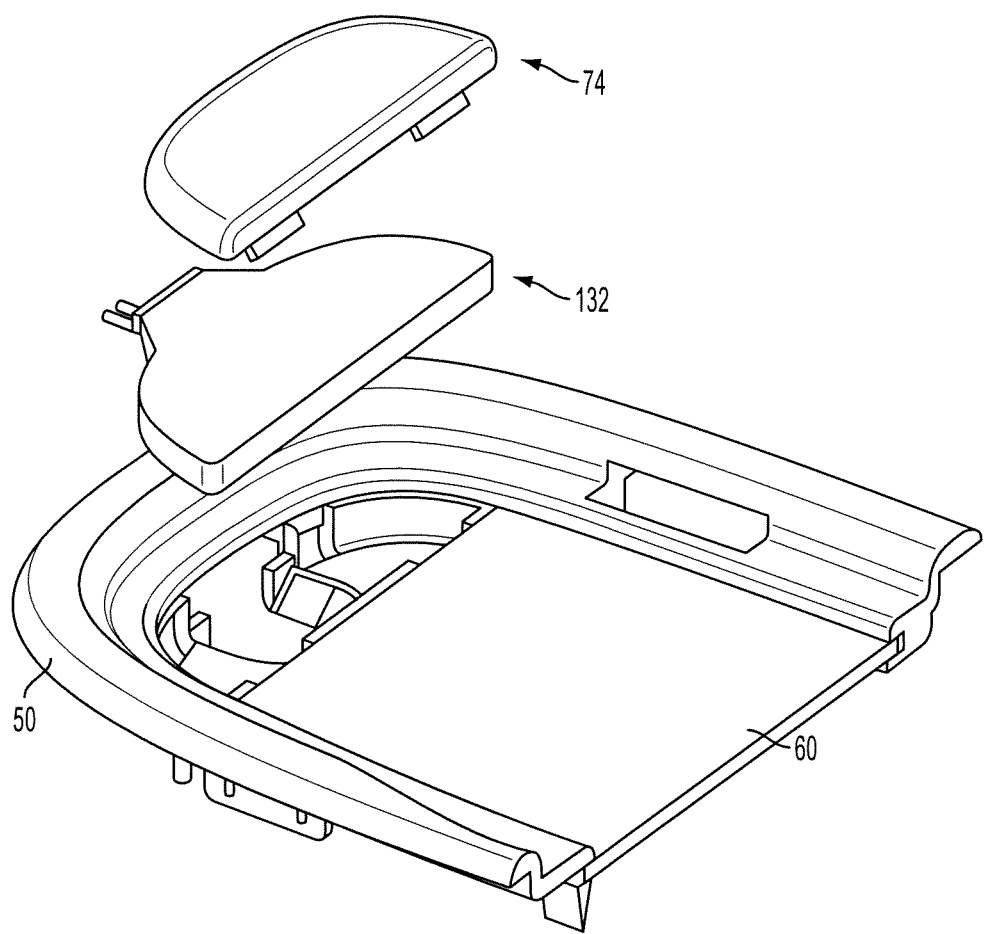
FIG. 18 shows an exploded view of a vanity according to an alternate embodiment of the present invention.
Figure 20:
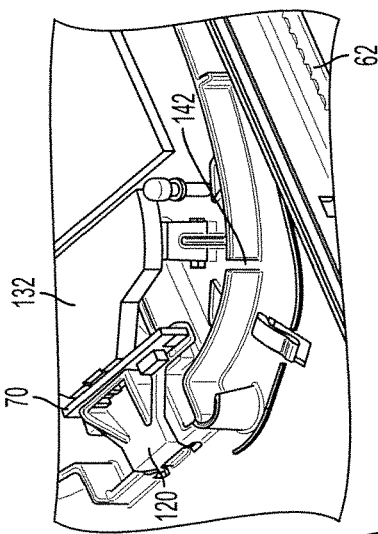
FIG. 20 shows a view of a visor according to an alternate embodiment of the present invention.
Figure 19:
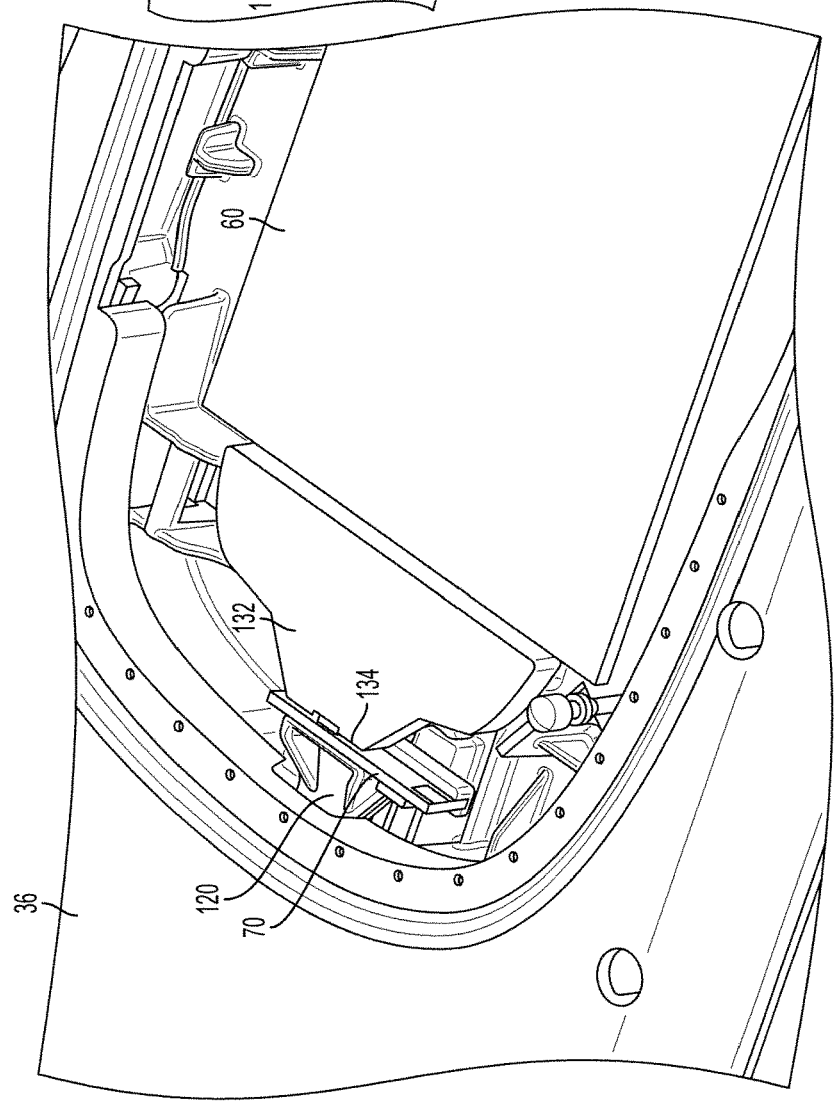
FIG. 19 shows a view of a visor according to an alternate embodiment of the present invention.
Figure 26:
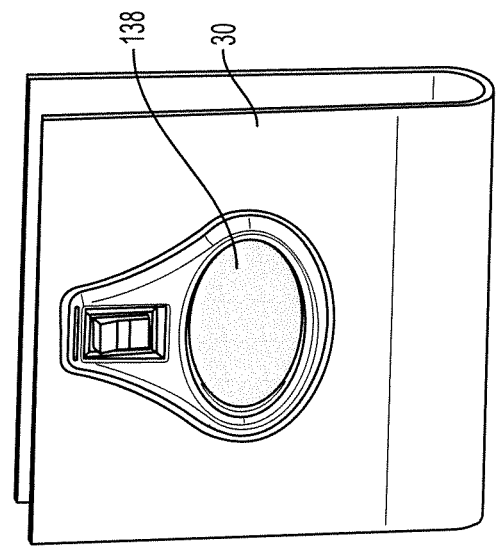
FIG. 26 shows a map light arranged in a visor according to an alternate embodiment of the present invention.
Figure 25:
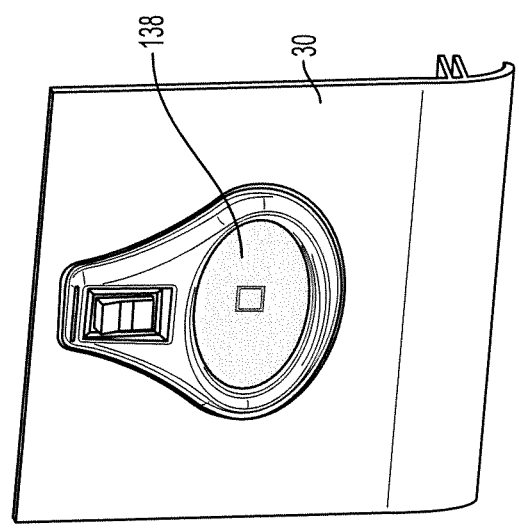
FIG. 25 shows a map light arranged in a visor according to the present invention.
Figure 27:
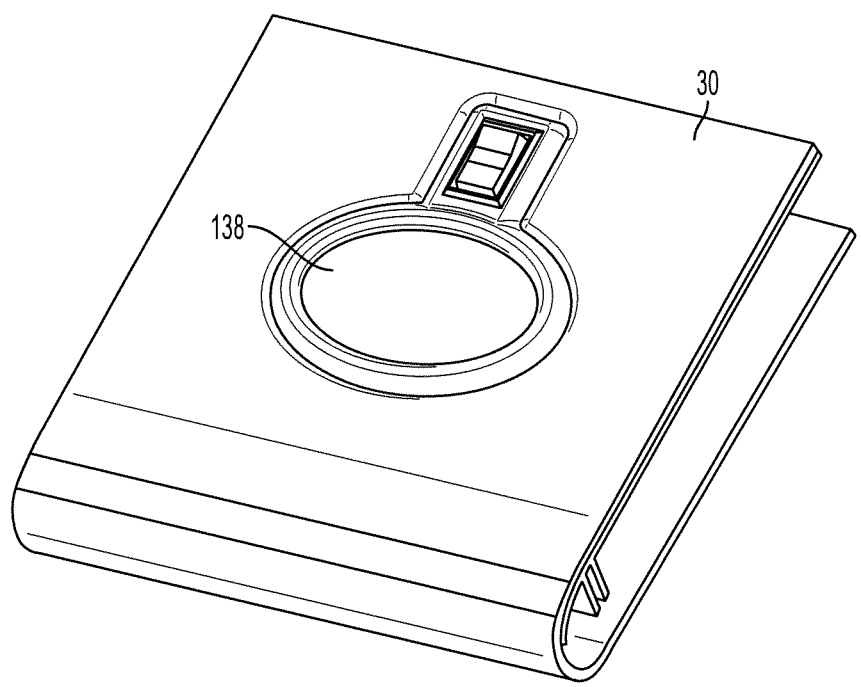
FIG. 27 shows a map light arranged in a visor according to an alternate embodiment of the present invention.
Figure 28:
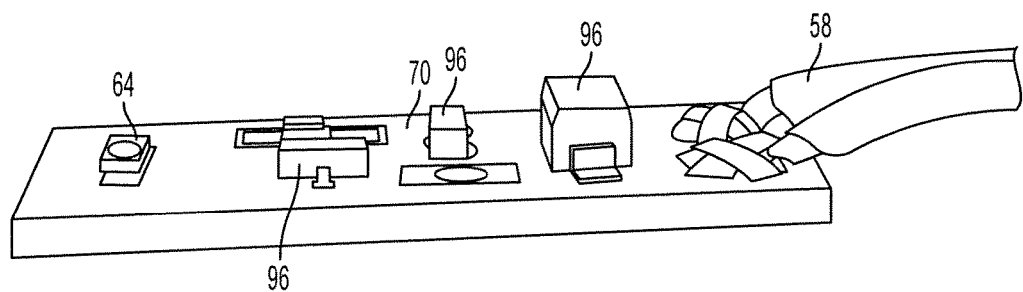
FIG. 28 shows a LED attached to a circuit board according to the present invention.

Referring to the drawings, there is shown a visor 30 according to an embodiment of the present invention. Generally, the present invention broadly provides a clam shell type vehicle sun visor 30 having a pivot rod 32 mounted to a carrier 34, wherein the pivot rod 32 and carrier 34 are slidably captured during assembly with the single step of attaching visor shell portions 36, 38 together. The carrier 34 thus rides in the visor body 42 itself rather than a separate carrier and is preferably retained between surfaces and/or features, such as channels 40 molded integrally within the shell portions 36, 38. Similarly, the pivot rod 32 rides in the visor body 42, and a separate bracket, bezel or similar piece is not necessary to support the pivot rod 32. Related aspects of the present invention include methods for manufacturing a sun visor 30 also described herein. Furthermore, it should be noted that the visor 30 as shown in the present application can be used in any known type of vehicle, such as but not limited to, automotive vehicles, maritime vehicles, aerospace vehicles, military vehicles and any other known vehicle that has a need for the sun to be blocked from filtering into the interior compartment of the vehicle. It should also be noted that generally all of the components of the visor 30, according to the present invention, may be made of a plastic material that is capable of either being extruded, molded or shaped by any known manufacturing process. However, any other known metal, ceramic, plastic, composite, natural material or any other known material may also be used for any of the parts or components of the visor 30 described herein. Furthermore, it should be noted that the visor 30 of the present invention may be any known type of visor, such as a sliding visor, a non-sliding visor, a moveable visor, or any other type of visor known in the vehicle industry.

In one embodiment shown in the Figures, the visor 30 includes first 36 and second shell 38 halves or shells which are engageable to form an elongate visor body 42. Various molded features 48 may be included on each shell 36, 38 to facilitate engagement of the shells. For example, complementary structures may be formed on the respective visor shells 36, 38 that allow a snap-fit therebetween. In one contemplated embodiment, the shells 36, 38 may be formed having integral or connected longitudinal peripheral edges 44, 46 and, respectively. Other embodiments are contemplated in which shells are formed as separate, unconnected members. Although connected shells are preferred, the visor 30 has shown in the Figures may have unconnected shells also. The visor 30 further may include a pivot rod 32 that is arranged into one end of the visor body 42 and connect on the opposite end to a headliner or roof of the vehicle into which the sun visor 30 is arranged. The visor 30 is preferably formed such that the shells 36, 38 may be closed about pivot rod 32 and as such capture the pivot rod 32 therebetween in a single assembly step. Also, the visor 30 may include a carrier 34 which is slidably captured by the closure or engagement of the shells 36, 38, slidably securing the carrier between the shells 36, 38 without the need for installation of an internal slide member, retainer or similar mechanism for mounting the pivot rod 32. All the component parts of the visor 30 may be manufactured from any known materials and by known processes, such as but not limited to, any type of plastic, metal, ceramic, composite, natural material or any other known material, and by any type of molding technique, forming technique, chemical and mechanical process to design and make the components as described herein.

Generally, the shells 36, 38 are formed by injection molding a plastic material in a conventional manner. For example, the shells 36, 38 may be formed from a molded polyethylene, or by some other suitable method and/or material. The first 36 and second shells 38 generally include retaining surfaces in any known shape, such as arcuate retaining surfaces, flat or angled retaining surfaces, all of which may be elongate or trough shaped surfaces extending parallel to an edge of a visor shells and defining a portion of a cylinder or wall. It should further be appreciated that the present invention may encompass designs with retaining surfaces that vary in dimension between longer, trough-shaped features and more narrow arcuate ledges as shown. It should further be noted that an arcuate pair of surfaces may be aligned near one end of the visor shells 36, 38 to allow for the pivot rod 32 to be properly supported and capable of rotating and sliding with relation to the visor body 42. The visor half shells 36, 38 also may have a channel formed near one edge thereof, wherein the channel may have a first and second bearing surface. These bearing surfaces may be arranged at any known angle with relation to a center line of the visor body 42. In one contemplated embodiment, these angled surfaces may be arranged on each side of a channel that extends a predetermined distance along a longitudinal axis of the visor body 42 and these angled surfaces may be any approximate angle with relation to a center line of the visor body 42. It should be noted that these angled bearing surfaces may be arranged on each inner surface thereof. It should also be noted that the visor half shells 36, 38 may include other surfaces that receive and hold various components of the sliding visor 36, such as but not limited to the pivot rod 32, a D-ring, a vanity 66, and covering material 52 arranged over the visor body 36 to complete assembly thereof.

The shell halves 36, 38 that form the visor body 42 of the visor 30 according to the present invention also may include a plurality of hybrid snap and ultrasonic weld joints. In one contemplated embodiment, a plurality of profile snaps may be arranged around the front edge and the side edges of the arcuate shells of the visor shells 36, 38. One of the shells may have the male portion of the profile snap while the other shell may have the female portion, which receives the male portion and holds the first shell to the second shell in order to provide robust, zero flex interface between the two half shells 36, 38 to form a robust visor body 42. These snaps, which are arranged around the outer profile, may allow for enough flex for the front edge and side edges to allow for a tucking process to occur as described hereafter. The visor body 42 may also include at least one weld bar joint and at least one weld boss joint arranged at a predetermined position on the visor body 42. It should be noted that other contemplated methodologies and fasteners may be used to secure the two visor shell halves 36, 38 to one another, and it is also contemplated that the visor 30 is formed as one single body member and not of two separate shell halves.

One of the shell halves also may include a predetermined shaped orifice or cavity 54 on an outer surface thereof that may be used to receive and secure a vanity 66 to the visor body 42. The orifice or cavity 54 for receiving a vanity 66 may include a plurality of locking surfaces or locking arms that may interact with locking surfaces or flanges of a frame 50 of the vanity 66 to ensure the vanity 66 is secured to the outer surface of one of the shells of the visor body 42. These locking surfaces and fingers may take any known shape and are arranged such that both illuminated and non-illuminated visor vanities may be arranged therein. Other surfaces may also be molded into the visor half shells 36, 38 to allow for placement of wires 58 to illuminate a visor vanity mirror 60 or to receive a universal garage door opener or other component directly into the visor body 42. The visor half shells 36, 38 according to the present invention, may also include a plurality of teeth 62 arranged around an outer periphery of the front edge and side edges of each of the shell halves 36, 38. These teeth 62 generally have a pyramidal or triangular like shape tooth and may either be directly aligned with one another from each half shell or offset with one another from each half shell, depending on the design requirements and the tucking process to be used. This use of the teeth 62 to form a tuck edge and to have the cover material 52 placed by a tuck edge process into engagement with the teeth may create an aesthetically pleasing visor body 42 having a crisp and clean outer cover material 52 arranged thereover. It should be noted that in one contemplated embodiment the cover material 52 may be formed in the shape of a sock, wherein the sock is arranged over one end of the visor body 42 then the tuck process is used to create the clean front edge and side edges of the visor 30. However, any other known tuck process and cover material 52 that is not in the form of a sock may also be used depending on the design requirements and the visor 30 being created.

The visor 30, according to the present invention, may also include a D-ring secured to the visor body 42 on a top edge thereof. The D-ring may be any known D-ring. The D-ring of the present invention may partially assist in holding the cover material 52 in a taught, clean manner over the outer surface of the visor half shells 36, 38 formed into a visor body 42. It should be noted that any shape may be used for the D-ring body and D-ring pin associated therewith. The visor 30 may include a pivot rod 32 which is attached at one end to a bracket or connector which is secured to the headliner or roof of a vehicle. The bracket may have a connector secured thereto to connect the electrical system of the vehicle via a wire 58 to the bracket, the wire 58 is then passed through the pivot rod 32, which generally is hollow according to the present invention. However, it should be noted that a solid pivot rod 32 may be used, as long as it will be capable of passing electricity therethrough to allow for illumination of the vanity mirror 60 if necessary or map light

64. The bracket may be secured to the roof of the vehicle via fasteners or any other known methodology. The bracket may include an orifice that will receive one end of the pivot rod 32 near an elbow of the pivot rod 32, wherein the pivot rod 32 generally has an angle of 60°-120° at the elbow. The pivot rod 32 may be secured and capable of rotation within the orifice of the bracket and may also be swung between a front windshield of the vehicle and a side window of the vehicle to block the sun from any angle. The pivot rod 32 may be of any known length and diameter depending on the design of the visor 30 and the automobile into which it is arranged. The wire 58 may be connected from the electrical system of the automobile and is passed through to a LED 64 for illumination of a visor mirror 60 in the vanity 66. It should be noted that the visor 30, pivot rod 32 and bracket may be made of any known material, such as but not limited to plastic, ceramic, composites, metals, or natural material, etc.

The visor pivot rod 32 is arranged within a carrier 34 that is arranged within the visor body 42. The carrier 34 is capable of slidable movement if the visor 36 is a sliding visor. If the visor 30 is not a sliding visor, the carrier 34 is fixed with respect to the visor body 42. In the sliding visor the carrier 34 may slide within a channel 68 of the visor body 42 to allow for the visor 30 to be extended out towards an end of the visor rod 32 secured within the visor body 42. Any known carrier 34 may be used to secure the pivot rod 32 to the visor body 42, such as but not limited to a floating carrier, a fixed carrier or any other known carrier associated with a visor 32 rod and visor body 42.

The visor 30 may also include a wire routing system that passes a wire 58 from the bracket through the pivot rod 32 to the LED 64 vanity light for illumination of a vanity mirror 60 therein. Any known wire routing system may be used to pass the wire 58 through the visor body 42 to a circuit board 70 used to control and operate an LED 64 thereon. It should further be noted that it is also contemplated to use an onboard electric source to illuminate the LED 64 of the vanity 66 for the visor 30.

The visor 30 also may include a vanity 66. The vanity 66 generally includes a vanity door 72, door springs, a vanity spring, and a vanity mirror 60, with optional lights arranged thereon. If the vanity 66 is illuminated, the vanity 66 may also include at least one lens 74 to disperse light in a predetermined manner. In another contemplated embodiment, the vanity frame 50 may include two lens 74, one arranged on each side of the vanity 66 to illuminate the mirror 60. The vanity frame 50 generally may include at least one, but in the embodiment shown, two connecting flanges arranged near or at a bottom surface of the vanity frame 50. The opposite end of the vanity frame 50 may have arranged therein at least one locking shoulder or surface that may interact with locking tabs arranged on a surface of one of the visor shell halves 36, 38. This may allow for the vanity frame 50 and vanity 66 to be secured to the visor body 42 without fasteners, such as screws, etc. However, it should be noted that another embodiment may use fasteners and screws to connect the vanity frame 50 to the visor body 42. One contemplated embodiment may create a snap in vanity 66. Generally, the vanity frame 50 and door 72 may have a rectangular or oval shape, however any other shaped vanity 66 may be used depending on the design requirements of the visor 30. The vanity 66 and frame 50 may also include a flex hook arranged at one end thereof and a leaf spring arranged on an opposite edge of the orifice defined in the middle of the vanity frame 50. Adjacent to the leaf spring may be one or two locking tabs. This combination of the flex hook, leaf spring and locking tabs along with lens tabs that are used to secure the lens 74 to the vanity frame 50, may be used to secure a mirror 60 into a flexible interface without adhesives. In operation, the mirror 60 is placed under the flex hook and then snapped under the locking tabs and against the leaf spring to secure the mirror 60 without adhesives to the vanity frame 50. However, it is also contemplated to secure the mirror 60 to the vanity frame 50 with adhesives or any other methodology. The lens tabs, generally which are arranged on either side of the vanity frame 50 may keep the vanity mirror 60 positioned properly in a side to side direction with relation to the vanity frame 50. Hence, the vanity mirror 60, which may be of any shape, size or thickness, may be held in place to the vanity frame 50 without adhesives, which are generally used to hold a vanity mirror 60 to a frame 50 in the prior art. It should be noted that any number of leaf springs, locking tabs and flex hooks may be used to hold the vanity mirror 60 according to the present invention. The vanity frame 50 may be inserted into the visor body 42 by securing a first and second flange arranged near one end of the vanity frame 50 underneath inboard hooks that are molded into an outer surface of one of the core visor body half shells 36, 38. These flanges may be arranged under these inboard hooks and then the opposite end of the vanity frame 50 may be snapped into place with a downward force, such that the locking shoulders or surfaces of the vanity frame 50 may interact with the locking tabs or snaps molded onto and into the visor half shell 36, 38 in an outer surface thereof. This may secure the vanity 66 into the visor body 42 with a snap in system that does not require fasteners, such as screws, to secure the vanity system to the visor body 42. It should be noted that the vanity 66 of the present invention may include fasteners and screws to secure it to the visor body 42.

It should be noted that the visor half shell 36, 38 that holds and supports the vanity 66 also may include a light base 80 secured thereto. In one contemplated embodiment the light base 80 is molded into one of the shells 36, 38, such as the second shell 38 of the visor body 42. The light base 80 may include a pocket 82 therein which secures a circuit board 70 therein to hold the circuit board 70 in a predetermined fixed position with respect to the second shell 38 and the vanity 66. The pocket 82 may be formed or molded into a predetermined inside surface of the second shell 38. The light base 80 in this embodiment has the pocket 82 which in part is defined by a first and second guide member 84, wherein the first and second guide member 84 extends from an inside surface of the second shell 38 and are parallel to each other. Each of the first and second guide members 84 may have an inward extending flange 86 extending from a top end thereof. The flanges 86 may engage with a top surface of the circuit board 70 to assist in securing the circuit board 70 with relation to the vanity 66. The first and second guide members 84 generally may have any known predetermined shape, but may have a generally L shape when viewed from the front. The L shape may define a seat on each of the guide members 84 onto which the circuit board 70 may rest or be seated. The seat portion of the guide member 84 and the bottom surface of the inward extending flange 86 of the light base 80 may have a predetermined distance therebetween. This predetermined distance generally may be equal to or greater than the thickness of the circuit board 70 that is arranged therein. The light base 80 also may include a stop wall 88 arranged at a back end thereof. The stop wall 88 may extend in a predetermined direction away from the inside surface of the second shell 38 of the visor body 42. During operation, the circuit board 70 may be slid within the front side of the pocket 82 of the light base 80 until one end of the circuit board 70 engages the stop wall 88 of the light base 80. The light base 80 may also include a locking arm 90 arranged generally at a mid line of the pocket 82. The locking arm 90 may engage with a predetermined portion of the circuit board 70 and secure the circuit board 70 within the light base 80. The locking arm 90 generally may have a rectangular shape with a locking shoulder 92 arranged on the end thereof. One end of the locking arm 90 may be molded directly into a surface of one of the half shells 36, 38 of the visor body 42. The other end may be moveable or flexible thus allowing for the locking arm 90 to pivot about the first end which is fixed and molded into the visor body half shell. This may allow for movement of the locking shoulder 92 and the locking arm 90 in order to engage with a predetermined portion of the circuit board 70. The locking arm 90 may have a predetermined spring co-efficient which may allow for the locking arm 90 to securely hold the circuit board 70 at a predetermined position with relation to the vanity 66.

The light base 80 may also include a gap or recess 94 formed between two predetermined surfaces to form a wire routing channel for the circuit board 70. The wire 58 may connect to one end of the circuit board 70 and on the other end to the electronic system of the vehicle, wherein the wire 58 may run through a predetermined area of the visor body 42 and through the pivot rod 32 into the electrical system of the vehicle. The circuit board 70 generally may have a rectangular shape, with a predetermined length, width and thickness. It should be noted that the circuit board 70 may be of any known shape, but in the embodiment shown is a rectangular shape. Arranged on a top surface of the circuit board 70 is an LED 64. It should be noted that the LED 64 may be of any type, color and any known shape. The LED 64 as shown in the drawings is generally a square LED 64. Electrical components 96 may be arranged on the circuit board 70 and form the necessary circuitry for illuminating the LED 64 and passing such illuminated light 70 to a lens 74 and mirror 60 of the vanity 66. The electronic components 96 may be, but are not limited to, diodes, resistors, capacitors, integrated circuits or any other known electrical component necessary to operate an LED 64. It should be noted that the LED 64 in the embodiment shown is secured within the light base 80, such that the circuit board 70 is parallel to an inside surface of the visor body 42. This in effect holds the circuit board 70 in a horizontal position with relation to the visor body 42. The use of this embodiment of the light base 80 may provide for a direct bulb replacement version of the LED lighted visor. This may allow for the circuit board 70 and LED 64 to be positioned in generally the same place or area as the prior art bulb and socket which was used in prior art visor designs. Generally, no changes to the vanity sub assembly are required other than the molding of the light base 80 therein. It should be noted that the circuit board 70 generally has the plurality of electronic components 96 arranged on a bottom surface thereof and on the opposite side of the LED 64, which may be arranged on a top surface of the circuit board 70. The circuit board 70 may also include a locking member 98 extending from the bottom surface, wherein the locking member 98 may interact and inter-engage with the locking shoulder 92 of the locking arm 90 of the visor body 42. It should be noted that the light base 80 and circuit board 70 may be arranged on each side of a vanity 66. However, it is also contemplated to have a LED 64 arranged on only one side of the vanity 66 and it is even contemplated to use a LED 64 on only one side of the vanity 66 and pass the light from that one LED 64 via a light guide to both ends or sides of the mirror 60 of the vanity 66.

Another embodiment of the visor 30 may include a light base 100 that is a separate component that is molded or formed separate from the visor body half shells 36,38. In this embodiment, the light base 100 generally has a rectangular shaped body that includes a first and second rail parallel 102 to one another on a bottom surface thereof. The rails 102 generally have a circular shape and extend from the bottom corner edge on each side thereof. The parallel rails 102 may have a predetermined diameter, which may mate and inter-engage with a predetermined channel molded onto one of the shells 36,38 of the visor 30. The light base 100 may also include a first and second arm 104 with one of the arms extending from each side thereof near a mid portion of the light base 100. The arms 104 generally may have any known shape, such as but not limited to a semi-circular or semi-silo shape when viewed from above. The arm 104 may extend a predetermined distance from the side of the light base 100. The arms 104 may have an angled surface on a top side thereof. The light base 100 may also include a locking tab 106 extending from a bottom surface thereof, wherein the locking tab 106 interacts and engages with a locking slot 108 arranged and molded within the shell 38. The locking tab 106 generally may extend between the first and second parallel guide rails 102 and from the bottom surface of the light base 100 such that the tab 106 generally has an arcuate shape extending from a bottom surface of the light base 100, wherein the locking tab 106 extends a predetermined distance beyond a surface of the guide rails 102. In one embodiment, the locking tab 106 is generally aligned along a mid point of the first and second arms 104, which extend from a side of the light base 100. Arranged on one end of the light base 100 is a slot 110. The slot 110 is formed, such that the circuit board 70 is placed within the slot 110 and secured in a predetermined position with respect to the second shell 38. The slot 110 is in part defined by a first and second leg 112 that extend from the light base 100. The first and second leg 112 may each have a groove that has a generally square shape arranged at a mid point thereof. Each of the grooves arranged in the first and second leg 112 may be used to hold one edge of the circuit board 70 arranged therein. A predetermined distance is arranged between the first and second grooves, such that the predetermined distance is generally equal to the width of the circuit board 70. This may allow for the circuit board 70 to be slid within the slot 110 arranged on the front end of the light base 100 and securing the circuit board 70 to the light base 100 via a locking snap member 114 arranged on a surface of the light base 100. The locking snap member 114 generally may be arranged near or on a surface near a mid point of the light base 100. Each of the legs 112 of the light base 100 may have a reinforcing rib 116 extending from a bottom surface of the leg 112 to a surface of the light base 100. The reinforcing ribs 116 generally may have a triangular shape when viewed from a side. The snap lock member 114 may be arranged between the ribs 116 adjacent to a predetermined shaped cavity arranged within an end of the light base 100. The predetermined cavity generally may have any known shape, but generally has a rectangular or square shape in the current embodiment. This may allow for the lock member 98 extending from a bottom surface of the circuit board 70 to inter-engage with the snap lock member 114 and hold the circuit board 70 in place within the light base 100 of the present invention. The snap lock member 114 may have any known shape and in one embodiment it generally has a triangular shape and extends a predetermined distance from an end of the light base 100 and a predetermined distance into the cavity that holds the lock member 98 of the circuit board 70. This may allow for the interaction and engagement of the snap lock member 114 with the lock member of the circuit board 70. It should be noted that the snap lock member 115 is only one contemplated embodiment to secure the circuit board 70 within the light base 100 and that any other known locking feature may be used to secure the circuit board 70 therein. The light base 100 of this embodiment may interact with a plurality of features that are molded into an inner surface of one of the half shells 36,35 of the visor body 42. The second shell 38 may have a first, a second, a third and a fourth locking surface 118 molded therein. The locking surfaces 118 generally are defined as slightly angled surfaces molded within one of the visor half shells 36,38. The surfaces 118 may be across from one another and hence, form a predetermined sized gap. This predetermined sized gap may generally be the same or slightly greater than the thickness of one of the arms 104 of the light base 100. This may allow for the light base 100 to be slid through these gaps, such that the arms 104 interact with the first and second locking surfaces 118, wherein the first locking surface 118 may create a force that may push the first locking surface 118 down onto the arm 104 of the light base 100, while the second locking surface 118 may in effect push with an upward force onto the arm 104 of the locking surface 118, which in effect may wedge the light base 100 into the half shell 38 via the arm 104 extending from each side thereof. Therefore, the first and second locking surfaces 118 may be arranged on each side of the light base 100 and formed within the visor half shell 38. The visor half shell 38 may also have molded therein a third and fourth locking surface 118. The third and fourth locking surface 118 generally may be defined by edges or surfaces extending from predetermined flanges molded within the visor half shell 38. The third locking surface may inter-engage with one of the guide rails 102, while the fourth locking surface 118 may inter-engage with the other of the guide rails 102 of the light base 100. Therefore, the third and fourth locking surfaces 118 may be arranged near one another such that the gap therebetween may generally be the same or greater than the diameter of one of the guide rails 102. It should also be noted that the third and fourth locking surfaces 118 may be angled with relation to the guide rails 102, such that each of the guide rails 102 may be wedged between the third and fourth locking surfaces 118 that are molded into one of the visor half shells 38. It should be noted that generally all of the locking surfaces 118 or features described herein are formed by flanges or channels molded directly into the visor half shell 38. In operation, the light base 100 described in this embodiment may be slid and locked into place within the visor half shell 38. The locking tab 106 may inter-engage with a locking slot 108 that is formed and molded into a surface of the second shell 38 generally at a mid point of the light base 100. This may allow for the light base 100 to inter-engage with the visor half shell 38 at four points and be locked via one point, thus securing the light base 100 in a predetermined position with relation to the visor half shell 38 and vanity 66. After inserting and securing the light base 100 into the visor half shell 38, a wire 58 may be connected between a surface of the circuit board 70 and the electrical system of the vehicle. This may allow for a direct replacement of the light bulb system of the prior art visors.

Still another embodiment of the light base 120 may generally have the same body, guide rails 102 and arms 104 as the light base 100 described above. This embodiment of the light base 120 may further include a first slot 122 arranged along a transverse portion of a top surface of the light base 120. The slot 122 may extend across the entire width of the light base 120. The slot 122 may be used to secure and hold one longitudinal edge of the circuit board 70. Directly adjacent to the slot 122 on the top surface of the light guide 120 may be a locking member 124 extending from a top surface thereof. The locking member 124 may be directly adjacent to the slot 122 and have a generally U-shape when viewed from a front thereof. The locking member 124 may have a first and second leg 126 extending from a top surface of the light base 120 and a cross member 128 extending between the two legs 126. Generally, the front of the locking member 124 may share the same plane as one of the inward extending surface walls of the slot 122. Each of the legs 126 generally may have a triangular shape when viewed from a side, however any other shape may also be used. The locking member 124 may be of such construction that there may generally be formed a rectangular orifice through a center of the locking member 124. An electrical component or other locking member extending from a surface of the circuit board 70 may be used to interact with at least one surface of the locking member 124 of the light base 120. This may secure and hold the circuit board 70 in a predetermined position with respect to the light base 120. A wire 38 may be connected to the circuit board 70 on either side or end of the circuit board 70. The top side of the circuit board 70 may have a LED 64 secured thereto and in electrical communication with the electronics of the circuit board 70 and the electrical system of the vehicle. The light base 120 may also include a pocket 130 arranged adjacent to the slot 122 on the side opposite that of the locking member 124. The pocket 130 may extend a predetermined distance into the light base 120. The pocket 130 generally has a rectangular shape when viewed from above. The slot 122 of the alternate embodiment of the light base 120 generally may hold the circuit board 70 in a vertical position with respect to the visor body half shell 38. This may allow for the LED 64 to be held in place in the visor 30 in a vertical manner, thus allowing for the use of a light guide 132 in conjunction with the vanity 66.

The light guide 132 may generally be of any known shape, but in the embodiment shown it has generally a modified pyramidal shape with a generally circular bottom portion and a parallelogram type top portion. It should be noted that any known shape may be used for the light guide 132 of the present invention. One end of the light guide 132 having the smaller dimension generally may have a notch or cut out 134 arranged therein. The cut out 134 may be used to align with the LED 64 arranged on the circuit board 70 of the present invention. The light guide 132 having any known shape may be used in any known visor 30. The notch or cut out 134 is arranged on one edge of the light guide 132 and may have any known shape, but is generally a square type cut out shape that may mimic the square shape of the LED 64 used herein. The LED 64 may shine its light directly in a head on manner into the edge or end of the light guide 132, thus allowing for dispersion of the light evenly throughout the entire light guide 132. The use of the light guide 132 may provide for a warmer and more even appearance of the light through the lens 74 of the vanity 66. The distribution of the light via the light guide 132 may ensure no hot spot when compared to that from a regular light bulb. It should be noted that the LED 64 may touch or engage the light guide 132 but it does not have to and that the vanity 66 may have one or more lights arranged therein. It is also contemplated to use a light guide 132 that extends from both sides of the vanity 66, such that a light may be emitted via one LED 64 onto both sides of a mirror 60 within a vanity 66. However, it is also contemplated to use two separate light guides 132, one arranged on each end of the vanity 66, along with a light base 120 arranged on each end thereof to form the illuminating light for the visor 30 according to the present invention. It should be noted that the light guide 132 has a predetermined thickness and is made of any known predetermined material that is capable of producing the distribution of the light as required by the present invention. It should be known that any known or unknown material may be used for the light guide and light guide systems arranged herein. It should further be noted that the LED or LED's 64 may be directly affixed or attached to the light guide 132 at a predetermined position thereon, such as but not limited to, at the notch 134, etc. The necessary electronics to operate the LED 64 directly attached to the light guide 132 may be arranged between the LED 64 and a power source for the visor or vehicle. Generally, the light guide 132 of the present invention may be arranged within the visor vanity frame 50 with a lens 74 arranged over a top surface thereof to protect the light guide surface. The lens 74 may be of any known type or design. In one contemplated embodiment the notch 134 of the light guide 132 may be approximately four millimeters wide, however any other shape, width or notch may be used for the input light area for the light guide 132. The vanity frame 50 of the present invention may include a predetermined shaped orifice therein that generally mimics the outer shape of the light guide 132. The light guide 132 may then be held within the vanity frame 50 through a press fit by using crush ribs 136 at strategic locations, such as on each corner end of the light guide 132. However, it should be noted that it is also contemplated to have the light guide 132 slid into position or held in place via snaps or a staking operation to ensure that the light guide 132 remains fixed with respect to the vanity frame 50 and light base 120 which holds and secures the LED 64 in relation to the light guide 132. Therefore, any of the known methodologies of holding such as a press fit, snap or staking may be used to hold the light guide 132 in position on one or both ends of the vanity frame 50, then the vanity frame 50 may have a lens 74 arranged over a top of the light guide adjacent to the mirror 60 to provide illumination, for the user, of the mirror 60 via the LED light 64 and light guide 132. It should also be noted that predetermined openings or pass-through 142 in ribs and other components of the visor half shell 38 may be arranged therethrough in order to pass the wire 58 from the electrical system of the vehicle to the circuit board 70 of the light base 120, wherein the circuit board 70 is being held in a vertical position.

It is also contemplated in the LED visor vanity of the present invention that instead of using a lens 74 over either a light guide 132 or a direct replacement LED 64, that either may be covered by extending the mirror 60 to the ends of the visor vanity frame 50 and eliminating any of the adhesive on the bottom of the mirror 60. This may allow for the light to shine directly through the mirror 60 and remove the need of the use of a lens 74 to disperse the LED light in a predetermined manner. Furthermore, it is also contemplated that a grid 140 may be molded into the vanity frame 50 in order to protect the light guide 132 or LED 64 and disperse the light from the light guide 132 or LED 64 in a predetermined manner. It is contemplated that these grids 140 may be of any known shape, such as a honey comb design, or arc lines with a support arm design as shown in the drawings. Any of these molded grids 140 or the extending of the mirror 60 while eliminating the tape on the bottom of the mirror may be used in conjunction with the LED system of the present invention. It should be noted that it is also contemplated that a map light 138 that may be arranged in the first or second shell 36, 38 of the visor body 42 may use a light emitting diode 64 and a light base 80 associated therewith according to the present invention to provide a map light 138 for use by the user of the vehicle, wherein the map light 138 may be a separate lighting system from that of the vanity mirror lighting system described herein.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for use in a vehicle, said visor comprising: a pivot rod; a carrier arranged over said pivot rod in a visor body; a first shell and a second shell being engaged to form said visor body; a vanity connected to said first shell; a light base arranged under said vanity on said second shell, said light base having a wall arranged at a back end thereof; a circuit board slid within a pocket of said light base towards said wall to be secured to said light base, said pocket in part is defined by a first guide member and a second guide member, said first guide member and said second guide member contacts a bottom surface of said circuit board, said light base having an inward extending flange extending from each of said first guide member and said second guide member, said inward extending flanges contact a top surface of said circuit board; and a light emitting diode secured to said top surface of said circuit board.

2. The visor of claim 1 wherein said light base is molded into said second shell.

3. The visor of claim 2 wherein said pocket receives and secures said circuit board with respect to said second shell and said vanity.

4. The visor of claim 1 further comprising a wire arranged within said pivot rod, said wire is connected to said circuit board.

5. The visor of claim 1 further comprising a cover arranged over said visor body.

6. The visor of claim 1 wherein said first guide member and said second guide member extends from an inside surface of said second shell, said first guide member and said second guide member each having a seat surface, said seat surfaces contact said bottom surface of said circuit board.

7. The visor of claim 1 wherein said light base having a locking arm arranged generally at a mid line of said pocket, said locking arm contacts and extends from said second shell, said locking arm engages said circuit board and secures said circuit board in said light base.

8. The visor of claim 1 wherein said inward extending flange is parallel to said second shell, said first guide member and said second guide member having a generally L-shape when viewed in cross section.

9. The visor of claim 1 wherein said vanity having a frame, a mirror and a lens.

10. The visor of claim 1 further comprising a map light arranged in one of said shells, said map light using said light emitting diode to emit light.

11. A visor for use in a vehicle, said visor comprising: a pivot rod; a carrier arranged over said pivot rod in a visor body; a first shell and a second shell being engaged to form said visor body; a vanity connected to said first shell; a light base arranged under said vanity on said second shell, said light base having a first rail and a second rail parallel to one another extending from a bottom surface of said light base, said light base having a tab extending between said first rail and said second rail from said bottom surface of said light base, said light base having an arm extending from each side thereof, said second shell having a first surface, a second surface, a third surface and a fourth surface arranged therein, and said light base is removably arranged within said second shell, said first and second surfaces engage with one of said arms, said third and fourth surfaces engage with one of said rails, said first surface and said-second surface are arranged across from one another and define a gap there between, said one of said arms is arranged in said gap; a circuit board engaging a slot of said light base; and a light emitting diode secured to a surface of said circuit board.

12. The visor of claim 11 wherein said slot being arranged in a top surface of said light base; said circuit board is placed within said slot and secured in a vertical position with respect to said second shell.

13. The visor of claim 12 wherein said light base having a locking member extending from a top surface thereof, said locking member secures said circuit board in place with respect to said light base.

14. The visor of claim 12 further comprising a light guide arranged in said vanity, said light emitting diode is arranged at a predetermined position with respect to said light guide.

15. The visor of claim 11 wherein said light base having a slot arranged in one end thereof, said circuit board is placed within said slot and secured in a horizontal position with respect to said second shell.

16. The visor of claim 15 wherein said light base having a snap lock, said snap lock engages with said circuit board and holds said circuit board in place with respect to said light base.

17. The visor of claim 11 wherein said tab is aligned along said arms, said tab interacts and engages with a locking slot arranged in said second shell, said tab having a generally arcuate shape.

* * * * *